United States Patent [19]

Bonnebat et al.

[11] 4,216,253

[45] Aug. 5, 1980

[54] MOLDING PROCESS FOR THE FABRICATION OF HOLLOW SHAPED ARTICLES

[75] Inventors: Claude Bonnebat, Pontault Combault; Gérard Halna du Fretay, Saint-Michel sur Orge, both of France

[73] Assignee: Rhone-Poulenc Industries, Paris, France

[21] Appl. No.: 858,273

[22] Filed: Dec. 7, 1977

[30] Foreign Application Priority Data

Dec. 9, 1976 [FR] France .................... 76 37101

[51] Int. Cl.² ............... B29D 23/04; B29C 17/07
[52] U.S. Cl. ..................... 428/35; 264/40.6; 264/209; 264/540; 366/340; 425/133.1; 425/144; 425/378 R; 425/380
[58] Field of Search ............... 264/40.6, 237, 349, 264/209, 329, 541, 176 F, 209; 366/340; 425/146, 467, 149, 381, 378 R, 198, 199, 144, 133.1, 380; 428/35, 36

[56] References Cited

U.S. PATENT DOCUMENTS

| | | | |
|---|---|---|---|
| 3,060,505 | 10/1962 | Brasie | 425/467 |
| 3,283,041 | 11/1966 | Sommerfeld | 264/40.6 |
| 3,404,203 | 10/1968 | Donald | 264/209 |
| 3,574,808 | 4/1971 | Matthews et al. | 264/541 |
| 3,666,649 | 5/1972 | Williams et al. | 264/40.6 |
| 3,806,097 | 4/1974 | Devellian et al. | 425/198 |
| 3,868,436 | 2/1975 | Ootsuji et al. | 264/40.6 |
| 3,911,073 | 10/1975 | Massance | 264/188 |
| 3,980,746 | 9/1976 | Carrow | 264/209 |
| 4,022,858 | 5/1977 | Cavanna et al. | 264/237 |

FOREIGN PATENT DOCUMENTS

| | | | |
|---|---|---|---|
| 2243944 | 3/1974 | Fed. Rep. of Germany | 425/199 |
| 43-4546 | 2/1968 | Japan | 264/176 F |

*Primary Examiner*—Jay H. Woo
*Attorney, Agent, or Firm*—Burns, Doane, Swecker & Mathis

[57] ABSTRACT

Hollow shaped articles are extruded, advantageously continuously extruded, from molten thermoplastics by controlled cooling of the molten charge prior to entry into an extrusion die.

19 Claims, 2 Drawing Figures

MOLDING PROCESS FOR THE FABRICATION OF HOLLOW SHAPED ARTICLES

BACKGROUND OF THE INVENTION

1. Field of the Invention

The present invention is directed to an improved manufacturing process for extruding or molding hollow thermoplastic bodies according to which the substance to be molded is thermally conditioned by cooling in a controlled and homogenous manner before being placed in a calibration die. The invention also pertains to objects prepared by this process.

2. Description of the Prior Art

In the classic prior art process the substance to be molded is melted and then continuously forced by a feeding device through an aperture of the appropriate form. The melted mass is then brought in contact with a conformator or mold in which it is deformed and progressively solidified in such a manner that it retains the form permanently.

Such processes require polymers having consistencies when molten which are sufficient to keep the polymer from being deformed under its own weight during the phase when the melted mass emerges from the die, before entering the conformator or the mold. Without such consistency, irregularities in the thickness of the wall of the finished object or weak points resulting in breakage of the extrusion products may occur, thereby completely disrupting the course of the process.

To avoid these inconveniences, it has been proposed to employ total guidance devices such as that described in the French Pat. No. 1,114,680, wherein a linkage or cylindrical coupler made of a poor heat conducting substance is inserted between the feeding pump and the molding device making it possible to lower the temperature to the maximum extent at the point where the melted substance enters the molding device. More recently, in French Pat. No. 2,132,141, a process for extruding crystalline textured profiles made of saturated polyesters has been disclosed wherein the substance to be molded is forced into an intermediate heated calibration die, which is thermally insulated from the head of the extruding machine, prior to introduction into the main die.

Unfortunately, the processes heretofore known in the art are not adapted to the production of tubes and profiles from thermoplastics having low consistencies. The handling of such thermoplastics requires slow cooling which results in low product output and often results in the formation of crystalline polymers. The only means of molding low consistency thermoplastics, heretofore recognized, is by injection molding, or blow molding or other types of molding by transfer. Thus, there remains a need in the art for a continuous extrusion and molding process which is particularly adapted for molding low consistency thermoplastic polymers.

SUMMARY OF THE INVENTION

Accordingly, it is a primary object of the present invention to provide a process for extruding and molding thermoplastic polymers into high quality, finished products which is not subject to the limitations of those processes presently existing in the art.

Another object of the invention is to provide a simple molding process which is capable of operation with thermoplastics of any viscosity and preferably those of low viscosity.

Still another object of the invention is to provide a continuous process for the manufacture of tubes, profiles, and hollow objects at sufficiently high rates so as to be readily adapted to industrial production.

Yet another object of the invention is to provide an apparatus for forming hollow, shaped articles from molten thermoplastic polymer material.

Other objects and advantages of the invention will be evident to those of skill in the art upon studying the detailed description which follows.

DETAILED DESCRIPTION OF THE INVENTION

The above objects and advantages are accomplished according to the present invention by a process which brings about an artificial increase in the viscosity of the molten thermoplastic mass by programmed cooling of the substance before it enters the extrusion die. The process comprises an improvement of conventional extrusion and molding processes by cooling the molten thermoplastic mass obtained from a source of the thermoplastic material from its original temperature $T_0$, which is above its temperature of complete fusion $T_{FF}$ to a temperature T, which is between temperature $T_{FF}$ and the temperature of the beginning of crystallization $T_{DC}$, prior to extrusion. The cooling is conducted in a homogeneous manner, under conditions which prevent the formation of crystalline seeds in the polymer as it passes from the extrusion means to the conformation or blow-molding device where the final, hollow shaped article is formed.

Figure 1:
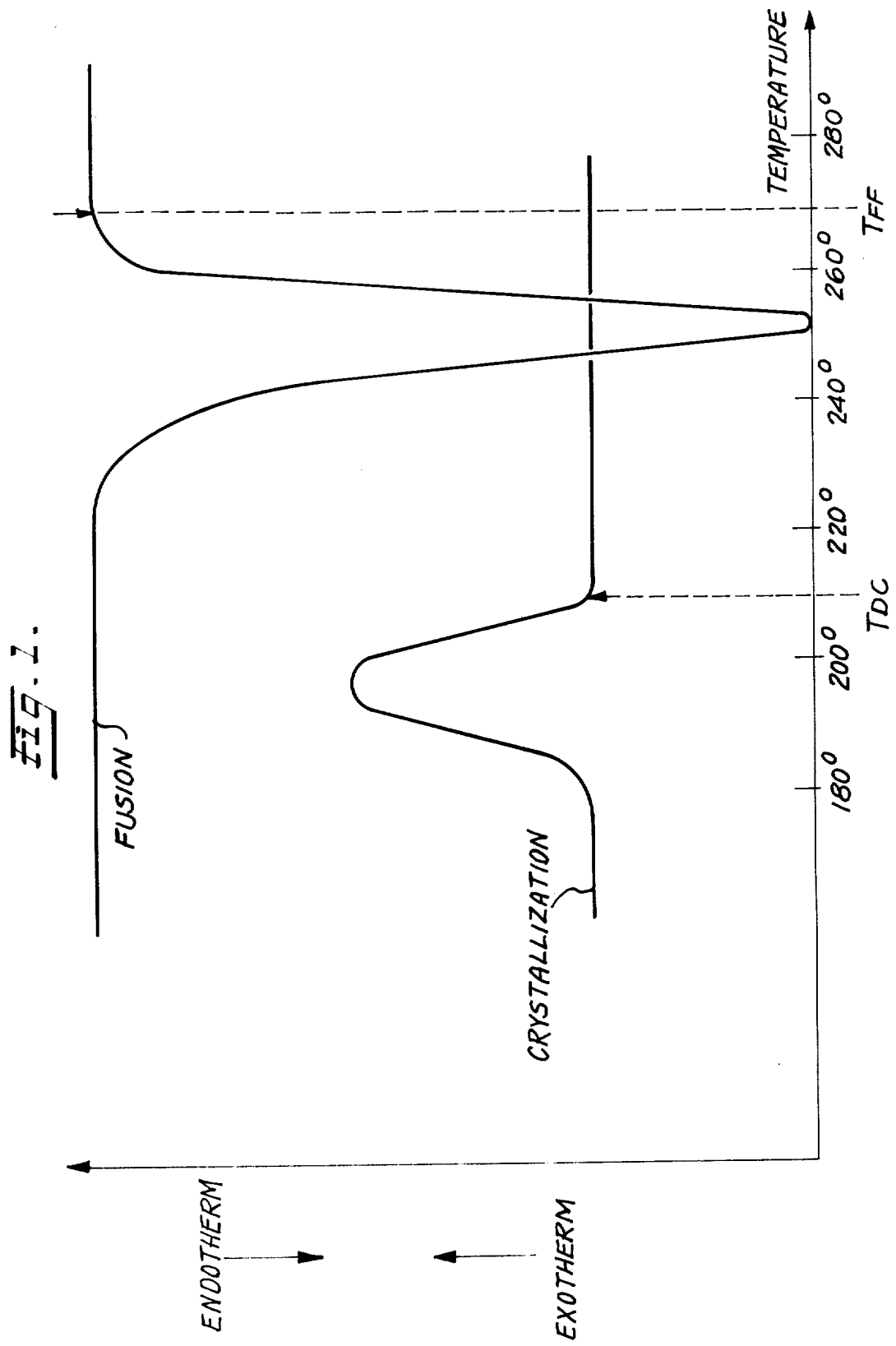
FIG. 1 represents a typical thermodynamic diagram of a semi-crystalline polymer, i.e., polyethylene terephthalate, based on a sample of 2 milligrams by means of a DSC or PONT 990 apparatus.

Both the fusion temperature, $T_{FF}$, and crystallization temperature, $T_{DC}$, can be measured by means of a differential scanning calorimeter or by microscopic examination, under heated platinum, of micro-samples which have been sequentially heated and then cooled. As herein employed, the temperature of fusion, $T_{FF}$, is defined as the final temperature of a completely fused sample in the course of programmed heating at a rate of 20° C. per minute, corresponding to the point of recovery of the base-line after the fusion endotherm. The temperature of crystallization, $T_{DC}$, is defined as the temperature at which crystallization begins in the course of programmed cooling at a rate of 20° C. per minute, corresponding to the point of modification of the base line at the beginning of the exotherm of crystallization. FIG. 1 graphically illustrates these two temperatures for a semi-crystalline polymer.

Generally, the most industrial grade semi-crystalline polymers, the difference $T_{FF}-T_{DC}$ is between about 30° and 60° C. However, this difference can be increased by removing insoluble catalytic residues or other impurities which serve as crystallization seeds or, more effectively, by copolymerizing or copolycondensing the polymer with a monomer which slows the rate of crystallization of the polymer.

The temperature $T_0$ is selected so as to avoid any phase heterogeneity in the molten mass. This temperature is generally a function of the rate and duration of shearing, and is at least about 5° C. higher than the fusion temperature, $T_{FF}$. In many semi-crystalline polymers, the difference between $T_0$ and $T_{FF}$ is observed to increase in direct proportion to the severity of the conditions of crystallization and in direct proportion to the need for plastification or subsequent extrusion operations. In polymers undergoing high temperature drying processes and in postcondensed polymers in the solid state, the difference varies normally from about 30° to 40° C.

The cooling of the thermoplastic mass melted at temperature $T_1$ is conducted homogeneously, that is to say, the entire melted vein and not merely the surface layers are brought to the temperature $T_1$, where they become stabilized. The cooling conditions and the residency time of the molten polymer are controlled so that the production of crystalline nuclei is avoided throughout the process. In this regard, it is essential that the cooling operation take place before the substance enters the die to eliminate the need for heavy hydrostatic pressure which would promote crystallization induced by shearing.

The cooling of the previously molten polymer in the manner of the present invention results in a simultaneous increase in the viscosity and the modulus of elasticity of the extrusion product. The increase in viscosity is a function of both the difference $T_0 - T_1$ which varies with the particular type of the polymer, its rate of crystallinity and other operational conditions, and the activation energy which demonstrates the effect of the temperature on the viscous-elastic behavior of the polymer in the fused or surfused stage. For example, when the thermoplastic polymer is polyethylene terephthalate, conditions are adjusted so that $T_0$ is between about 270° and 285° C. and $T_1$ is between about 220° and 250° C. When the polymers are surfused, the activation energy remains unchanged above and below.

According to a preferred embodiment of the present invention, the cooling to the $T_1$ temperature is carried out by means of a device which is positioned between a source of the molten polymer and an extrusion die. In general, $T_1$ is not more than 50° C. below $T_{FF}$ and preferably between about 25° and 5° C. below $T_{FF}$. The source of the molten polymer can be an extrusion machine, a mass polymerization reactor connected directly or through a volumetric pump, or any conventional device used for plastification and transfer. Exemplary of such devices are static or dynamic mixers, which advantageously provide efficient and homogenous thermal exchange without high pressure drop. Moreover, such devices can be adapted by a relatively simple selection of the number, geometry, and element temperatures to obtain the desired temperature difference, $T_1 - T_0$.

In the use of a mixer of the ISG type (interfacial surface generator, trade name ROSS) with four channels, it is possible to calculate the cooling efficiency for each element, and consequently the total number of elements needed to satisfy a relationship of the following type:

$$T_S = \frac{T_e(1-K) + 2KT_p}{1+K} \text{ wherein}$$

$T_S$ and $T_e$ are the temperatures of the fluid vein at the outlet and inlet, respectively, of the changing element, $T_p$ is the temperature of the wall of the changer, which is assumed to be constant along an element, $$K = \frac{\lambda}{Cp} \frac{S}{2D} \frac{Nu}{m}$$

is a characteristic coefficient of the system in which:
$\lambda$, $Cp$ represents the thermal conductivity and the average calorific capacity of the polymer,
$S$, $D$ are geometric elements (surface, diameter) of the exchanger,
$Nu$ is the Nusselt number,
$m$ is the mass output of the polymer.

In the case of the ROSS-ISG mixer, the Nusselt number can be approximated empirically by:

$$Nu = 3.65 + 3.8 \, [Re.Pr. \frac{D}{L}]^{\frac{1}{3}}$$

where Re.Pr. are Reynolds and Prandtl numbers.

Figure 2:
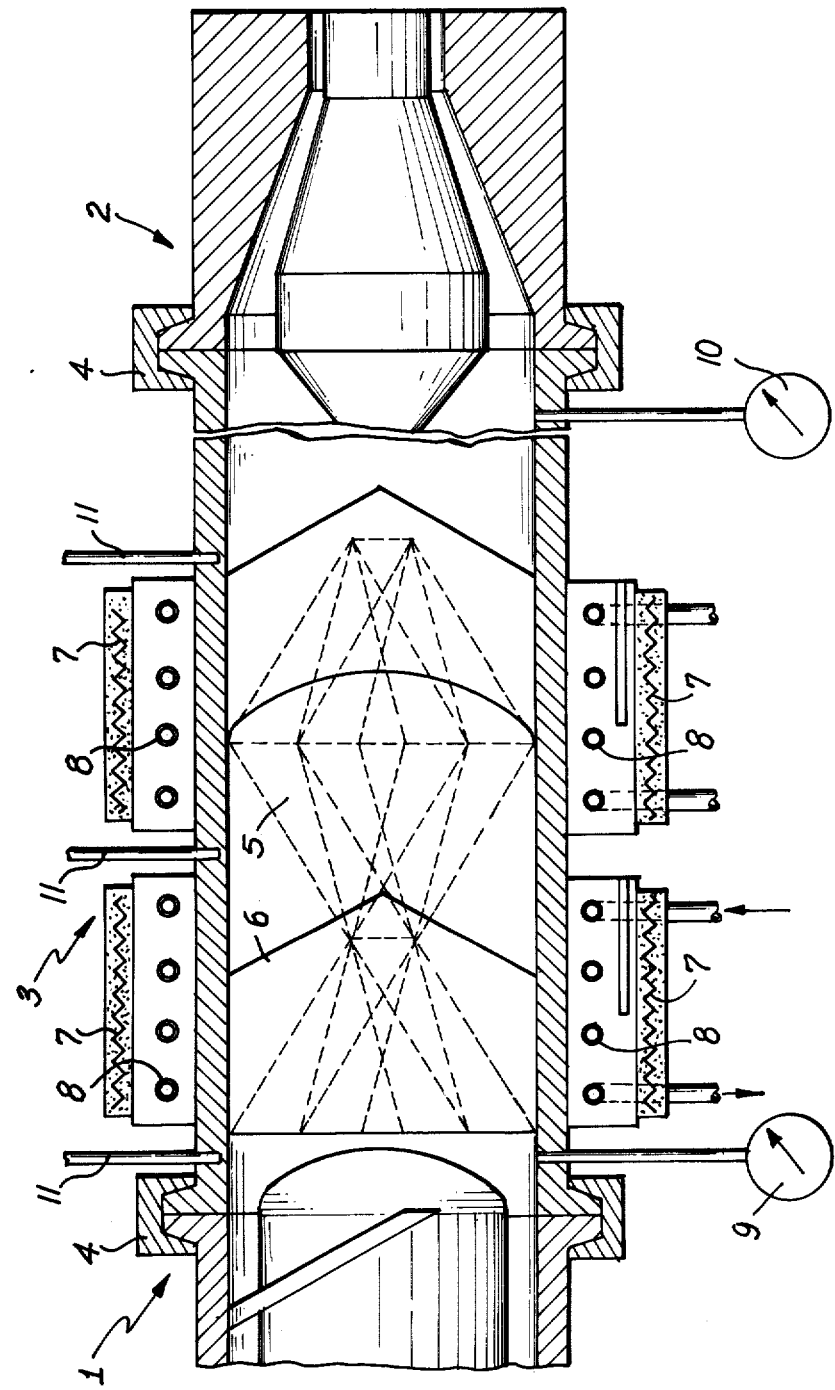
FIG. 2 represents the apparatus used to carry out the process of the present invention.

FIG. 2 shows a diagram of an apparatus capable of performing the process of the present invention. The source of the molten polymer, which for reasons of simplicity is represented by an extrusion machine 1, is separated from the extrusion head 2, which consists of a calibrating and gauging die, by a thermal homogenization device 3. As used herein, the terms calibrating die and extrusion die are intended to signify the numerous, conventional devices used for extruding thermoplastic material. The thermal homogenization device includes one or more static mixing elements connected to the extruding machine and the extrusion head by flanges 4. Only one base element 5 with a half coupling element 6 is shown in the figure. On the periphery of each element, electric or fluid circulating heating circuits 7 and cooling circuits 8 are placed to allow adjustment of the temperature of the elements to the desired value. Pressure valves 9 and 10, at the inlet and outlet, respectively, of the thermal homogenization device, as well as temperature valves 11 located in the walls of each mixing element, make it possible to control the pressure drop and the temperature variation of the extrusion product. A practical way of regulating the operation of the thermal homogenization device comprises either progressively adjusting the temperature of the wall until the desired temperature is obtained, i.e., the temperature required to effect molding of the polymer, or in progressively controlling the pressure drop above the mixer. Indeed, a level of viscosity set at the exchanger inlet corresponding to a specific pressure drop stabilizes the pressure drop in a permanent regime which guarantees that the entire process is stable.

It is understood that the utility of the present invention is not limited to crystalline polymers. It is equally adapted for semi-crystalline or slightly crystalline polymers. Exemplary of these semi-crystalline polymers are polyolefins such as polypropylene and polyethylene, saturated polyesters such as polyethylene terephthalate and polybutylene terephthalate, polyamides, polyvinyl fluoride, isotactic polystyrene, and polyacetals. Typical polymers of slight crystallinity are polyvinyl chloride, both rigid and plastified, chlorinated polyvinyl chloride, copolymers of vinyl chloride with vinyl acetate or vinyl propene chloride, copolymers of ethylene with vinyl acetate and polycarbonates. Of these various polymers, polyethylene terephthalate is preferred. The process may also be adapted for use upon completely amorphous polymers, in which case the course of cooling is brought to the point of gelation several degrees above the point of vitrous transition.

The present invention is particularly effective for use with thermoplastic polymers having a degree of viscosity in the molten state of less than about 30,000 poise, particularly between about 1,500 and 15,000 poise (viscosity measured by means of a conic-plane device, by a rheometer with capillary or eccentric plane-plane at shearing speeds of 0.1 to 10 seconds $^{-1}$), which cannot be used directly in convention extrusion and extrusion-blow molding processes.

If the cooling rate in the conformer is greater than the speed of crystallization, the hollow thermoplastic bodies prepared by the process of the present invention will be amorphous. Conversely, if the speed of crystallization is greater than the rate of cooling in the conforming device, a crystalline or partially crystalline thermoplastic body will be produced. In both cases, the hollow bodies obtained are highly regular, generally deviating less than ±5%, if at all, even when using polymers have low molten viscosities. In comparison, such product regularity is obtained by conventional processes only when thermoplastics having molten viscosities in excess of 20,000 poises are employed.

By the term "hollow body" is meant any hollow object which can be manufactured from extrusion or extrusion-blow molding devices including parisons, tubes, open and closed linear profiles, performs and bottles. Moreover, it is understood that the hollow bodies prepared in accordance with the invention can be modified by further treatment as for example, matrix forging. Additionally, they can be lined with a varnish by coextrusion, pulverization, coating or soaking. Finally, they may be subjected to subsequent operations including re-orientation, forming under pressure, crystallization, and/or heat-setting.

To further illustrate the various objects and advantages of the invention, the following examples are provided, it being understood that their purpose is entirely illustrative and in no way intended to limit the scope of the invention.

EXAMPLE 1

A continuous process was used to manufacture a tube made of saturated polyester 2.5 millimeters thick and having an external diameter of 24.8 millimeters.

A single-screw extrusion machine of the SAMAFOR trademark (75 millimeters in diameter, 28 D long), a die of 40 millimeters equipped with a core of 34 millimeters and vacuum sizing and cooling bath of the KAUFMANN type (floating jar), adjusted for distance and with adjustable level in the axis of the die was employed. A cooling-heating device with controlled thermal homogenization consisting of eight ISG elements of the firm ROSS (diameter of 4 inches with 4 channels) was positioned between the extrusion machine and die.

A copolymer polyethylene terephthalate isophthalate containing 3% of isophthalic acid having the following characteristics was used:
  intrinsic viscosity (measured at 25° C. in orthochlorophenol): 0.75 deciliter per gram;
  melting viscosity (measured at 290° C. on the DAVENPORT Grader): 4,400 poises:
  $T_{FF}$: 260° C.;
  $T_{DC}$: 208° C.

The polymer was introduced in the form of a forced flow starting from the extrusion machine which was heated to 290° C. The output was 45 kilograms per hour in the thermal-homogenization device. In this device, the temperature of the extrusion product was reduced regularly and progressively by temperature control of the wall of the elements, until a temperature of 240° C. was reached at the inlet of the die. At the outlet of the die, the substance passed into the thermostatic calibration die, then into the vacuum sizing and cooling bath.

The tube thus continuously obtained was completely amorphous and showed variations of axial thickness or radial thickness of less than ±5%.

EXAMPLE 2

Four conformation chains of tubes were installed in parallel at the outlet of a continuous reactor for polycondensation of homopolyterephthalate of ethylene glycol, which deliver the molten polymer at a temperature of 280° C. at the rate of 250 kilograms per hour.

The polymer exhibited the following characteristics:
  intrinsic viscosity (at 25° C. in orthochlorophenol): 0.80 deciliter;
  melting viscosity (at 290° C. of DAVENPORT Grader): 4,500 poises;
  $T_{FF}$: 260° C.
  $T_{DC}$: 213° C.

The distribution of the molten product along the different conformation lines was provided by the volumetric pumps. Between each volumetric pump and each calibration die, there was positioned a thermal homogenization device consisting of 12 static mixing elements of the ISG type [ROSS Trademark]. As a result of the passage through these elements, the molten polymer was brought to a temperature of 245° C. homogenously. A conformation device under vacuum made it possible to extrude tubes having walls 2 to 3.5 millimeters thick. These tubes were regular, amorphous, and transparent, having excellent internal and external appearance. They were particularly useful as preforms for bioriented hollow bodies.

EXAMPLE 3

Non-oriented bottles of saturated polyester were prepared by extrusion-blowing using a machine of the type BEKUM HBD 110, modified by inserting a thermal homogenization device at the base of 12 elements of STATIC MIXER (trademark of the firm KENICS). A mold which produced ribbed bottles (18 ribs of a curvature radius of 2 millimeters on the right side), which have the following dimensions was used: capacity 1.25 liters, height 300 millimeters, diameter of the body 85 millimeters, diameter of the neck 22-28 millimeters.

The polyester was modified polyethylene terephthalate containing 1.2% of trimethylolpropane and 3% of isophthalic acid, of intrinsic viscosity of 0.74 deciliter per gram, melting viscosity 5,390 poises, $T_{FF}$ 253° C., $T_{DC}$ 212° C.

The substance was melted at 285° C. in the extrusion machine and brought to a temperature of 250° C. at the outlet of the thermal homogenization device.

The distribution of the thickness of the wall was measured at various points of the finished bottle, the weight of which was 50 grams. The results are as follows:

| Level of the sample | Thickness in mm |
|---|---|
| Upper ribs of the right side | 0.42 |
| 1st third | 0.40 |
| 2nd third | 0.42 |

| Level of the sample | Thickness in mm |
| --- | --- |
| 3rd third | 0.44 |
| Lower part (bottom) | 0.70 |

As evinced by these figures, the bottle showed tolerances of thickness (in the longitudinal or transversal direction) of ±5%. Mechanical properties were excellent. In particular, the resistance to vertical compression (unfilled) was 15 kilograms. The resistance to an uncontrolled drop was 1.50 meters (average height, 50% of breakage of bottle filled with water at 23° C.).

In the foregoing examples, polymers of low melting viscosity were used deliberately to clearly demonstrate the advantages of the present invention. However, it must be understood that the examples of the production described above must not be considered as limitative, that any modification, particularly modifications in the form of the material, can be introduced without going beyond the framework of the invention.

While the invention has now been described in terms of various preferred embodiments, the skilled worker in the art will recognize that certain modifications, substitutions and omissions can be made without departing from the spirit of the invention. Therefore, it is intended that the scope of the invention be limited solely by the claims which follow.

What is claimed is:

1. In a process for the manufacture of hollow-shaped thermoplastic articles comprising forming a molten mass of thermoplastic polymer, extruding said mass and subsequently forming the extruded thermoplastic into a hollow-shaped article, the improvement comprising cooling the molten thermoplastic mass from its original temperature $T_0$, which is above its temperature of complete fusion $T_{FF}$, to a temperature $T_1$ which is between temperature $T_{FF}$ and the temperature of the beginning of crystallization $T_{DC}$, prior to entry into the extrusion die.

2. The process as defined by claim 1, wherein the temperature of the thermoplastic mass is changed homogeneously.

3. The process as defined by claim 1, wherein said extrusion is performed by passing the molten thermoplastic mass through a calibrated, extrusion die.

4. The process as defined in claim 3, wherein said hollow-shaped article is formed from said extruded thermoplastic mass by a conformation and/or blow molding device.

5. The process as defined by claim 1, wherein said molten thermoplastic mass has a viscosity lower than about 30,000 poise.

6. The process as defined by claim 5, wherein said molten thermoplastic mass has a viscosity between about 1,500 and 15,000 poise.

7. The process as defined by claim 1, wherein said thermoplastic polymer comprises homopolymers and copolymers of polyethylene terephthalate.

8. The process as defined by claim 7, wherein said thermoplastic polymer is melted at said temperature $T_0$ which is at least 5° C. above the temperature of complete fusion $T_{FF}$ of said thermoplastic polymer and subsequently, homogeneously cooled to said temperature $T_1$ prior to entry into the extrusion die.

9. The process as defined by claim 8, wherein said temperature $T_1$ is not more than 50° C. below temperature $T_{FF}$.

10. The process as defined by claim 9, wherein said temperature $T_1$ is between about 25° and 5° C. below temperature $T_{FF}$.

11. The process as defined by claim 8, wherein said thermoplastic is polyethylene terephthalate having a molten viscosity between about 1500 and 15,000 poise and wherein temperature $T_0$ is between about 270° and 285° C. and temperature $T_1$ is between about 220° and 250° C.

12. The process as defined by claim 4, wherein said cooling is accomplished by a heat exchange means located between the source of the molten thermoplastic mass and the calibrated extrusion die.

13. The process as defined by claim 1, wherein the molten thermoplastic polymer is selected from the group consisting of a crystalline thermoplastic polymer, a semi-crystalline thermoplastic polymer and an amorphous thermoplastic polymer.

14. The process as defined by claim 13, wherein the molten thermoplastic polymer is crystalline.

15. The process as defined by claim 13, wherein the molten thermoplastic polymer is sem-crystalline.

16. The process as defined by claim 13, wherein the molten thermoplastic polymer is amorphous.

17. The process as defined by claim 1, the same being conducted continuously.

18. Hollow-shaped amorphous thermoplastic articles prepared by the process of claim 1.

19. Hollow-shaped crystalline thermoplastic articles prepared by the process of claim 1.

* * * * *